United States Patent
Massetti et al.

(10) Patent No.: US 10,208,950 B2
(45) Date of Patent: Feb. 19, 2019

(54) WASTE SLUDGE INCINERATOR USING PYROLYSIS AND GASIFICATION, AND RELATIVE PROCESS

(71) Applicant: ENI S.p.A., Rome (IT)

(72) Inventors: Felicia Massetti, Capalbio (IT); Maria Ilaria Pistelli, Tarquinia (IT); Medardo Pinti, Rome (IT)

(73) Assignee: ENI S.p.A., Rome (IT)

( * ) Notice: Subject to any disclaimer, the term of this patent is extended or adjusted under 35 U.S.C. 154(b) by 492 days.

(21) Appl. No.: 15/025,835

(22) PCT Filed: Oct. 2, 2014

(86) PCT No.: PCT/IB2014/065021
§ 371 (c)(1),
(2) Date: Mar. 29, 2016

(87) PCT Pub. No.: WO2015/049659
PCT Pub. Date: Apr. 9, 2015

(65) Prior Publication Data
US 2016/0245508 A1 Aug. 25, 2016

(30) Foreign Application Priority Data
Oct. 3, 2013 (IT) .............................. MI2013A1636

(51) Int. Cl.
*F23G 7/00* (2006.01)
*C10J 3/60* (2006.01)
(Continued)

(52) U.S. Cl.
CPC .............. *F23G 7/001* (2013.01); *C02F 11/06* (2013.01); *C02F 11/10* (2013.01); *C10J 3/005* (2013.01);
(Continued)

(58) Field of Classification Search
CPC . F23G 7/001; F23G 5/44; F23G 5/027; F23G 5/04; F23G 5/0273; F23G 5/006;
(Continued)

(56) References Cited

U.S. PATENT DOCUMENTS 5,466,383 A 11/1995 Lee
2012/0184797 A1 7/2012 Rispoli et al.

FOREIGN PATENT DOCUMENTS

CN 1689962 A 11/2005
CN 1842584 A 10/2006
(Continued)

OTHER PUBLICATIONS

International Search Report dated Jan. 23, 2015 in PCT/IB2014/065021.
(Continued)

*Primary Examiner* — David J Laux
(74) *Attorney, Agent, or Firm* — Oblon, McClelland, Maier & Neustadt, L.L.P.

(57) ABSTRACT

The present invention relates to reaction equipment for the treatment of organic and/or inorganic waste of refineries or petrochemical plants comprising: •—a drying and pyrolysis device (4) which rotates around its longitudinal, tilted rotation axis (A), •—a gasification device (6) which rotates around its longitudinal, horizontal rotation axis (B), •—a combustion device (14) comprising a burner (13) having a longitudinal horizontal axis (C), •—at least one settling chamber (15) for the collection of intermediate solid residues and the accumulation of intermediate gaseous reaction products, •—at least one outlet duct of the gaseous end-products (16), at least one outlet duct of the solid end-products (7), and at least one inlet duct of the feedstock (2) •—said combustion device (14), drying and pyrolysis device
(Continued)

Figure 1:
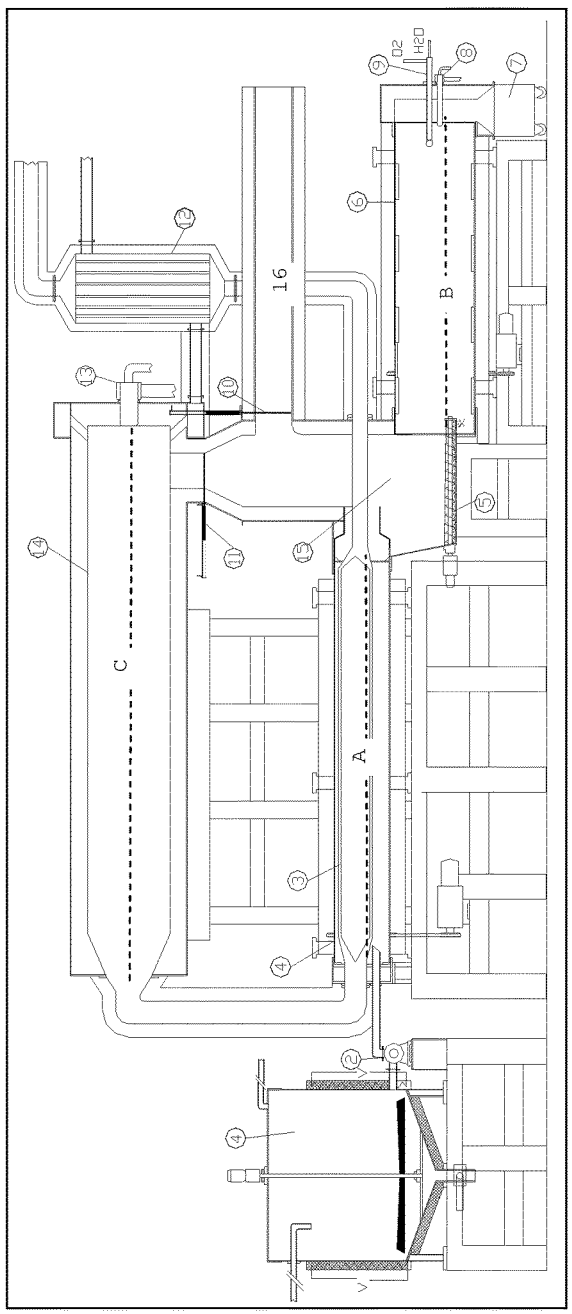

(4), gasification device (6) are physically separated and positioned on three different levels, •—the longitudinal rotation axis (A) of the drying and pyrolysis device (4) is tilted with respect to both the longitudinal rotation axis (B) of the gasification device (6) and also with respect to the longitudinal axis (C) of the combustion device (14), •—the longitudinal rotation axis (B) of the gasification device (6) is parallel to the longitudinal axis (C) of the combustion device (14), •—the combustion device (14) is in fluid communication with the drying and pyrolysis device (4), •—the drying and pyrolysis device (4) comprises, in its interior, a first indirect heat exchange device (3) in which the combustion fumes coming from the combustion device (14) flow, •—at least one settling chamber (15) in fluid communication with said drying and pyrolysis device (4) and with said gasification device (6) and with said combustion device (14), •—conveying means (5) are positioned in the settling chamber (15) and put the drying and pyrolysis device (4) in fluid communication with the gasification device, •—it comprises a second heat exchange device (12) in fluid communication with the first indirect heat exchange device (3) and the combustion device (14), •—it comprises means for the suction of the intermediate gaseous reaction products, said means being positioned in the settling chamber (15).

14 Claims, 1 Drawing Sheet

(51) Int. Cl.
*F23G 5/027* (2006.01)
*C02F 11/06* (2006.01)
*F23G 5/00* (2006.01)
*F23G 5/04* (2006.01)
*C10J 3/00* (2006.01)
*C02F 11/10* (2006.01)
*F23G 5/20* (2006.01)
*F23G 5/46* (2006.01)

(52) U.S. Cl.
CPC .............. *C10J 3/60* (2013.01); *F23G 5/006* (2013.01); *F23G 5/027* (2013.01); *F23G 5/0273* (2013.01); *F23G 5/04* (2013.01); *F23G 5/20* (2013.01); *F23G 5/46* (2013.01); *C10J 2200/158* (2013.01); *C10J 2300/1246* (2013.01); *F23G 2201/101* (2013.01); *F23G 2201/302* (2013.01); *F23G 2201/303* (2013.01); *F23G 2201/40* (2013.01); *F23G 2203/211* (2013.01); *F23G 2206/10* (2013.01); *F23G 2209/12* (2013.01); *F23G 2900/50001* (2013.01); *F23G 2900/50201* (2013.01); *F23G 2900/50204* (2013.01); *F23G 2900/52001* (2013.01); *F23G 2900/52002* (2013.01); *F23G 2900/54402* (2013.01); *Y02W 10/40* (2015.05)

(58) Field of Classification Search
CPC ........ F23G 5/20; F23G 5/46; F23G 2201/303; F23G 2900/50001; C10J 3/60; C10J 3/005; C10J 2200/158; C10J 2300/1246; C02F 11/06; C02F 11/10; Y02W 10/40
See application file for complete search history.

(56) References Cited

FOREIGN PATENT DOCUMENTS

CN 102746901 A 10/2012
DE 32 17 040 A1 11/1983
WO WO 2011/007231 A2 1/2011

OTHER PUBLICATIONS

Combined Chinese Office Action and Search Report dated Jan. 23, 2017 in Patent Application No. 201480054785.9 (with English language translation).

WASTE SLUDGE INCINERATOR USING PYROLYSIS AND GASIFICATION, AND RELATIVE PROCESS

The present invention falls within the field of waste disposal of plants such as refineries and petrochemical plants.

In particular, the present invention relates to reaction equipment for the treatment of waste capable of exploiting the heat and energy of waste coming from refineries or petrochemical plants, preferably organic and/or inorganic waste and the relative treatment process. The present invention also relates to a plant for the treatment of said waste products, said plant preferably using said reaction equipment.

In the present patent application, all the operative conditions indicated in the text should be considered as being preferred conditions, even if not specifically declared.

For the purposes of the present invention, the term "comprise" or "include" also comprises the term "consist in" or "essentially consisting of".

For the purposes of the present invention, the definitions of the ranges always include the extremes, unless otherwise specified.

Waste products having a lower calorific value (LCV) (or lower heating value (LHV), (PCI) in Italian) higher than 13,000 kJ/kg, produced in refineries and petrochemical plants, cannot be discharged into landfills according to the provisions of Law Decree nr. 36 of 2003 (Implementation of the directive 1999/31/EC relating to waste landfills published in the Official Gazette nr. 59 of Dec. 3, 2003—Ordinary Supplement nr. 40). Article 6 of said decree, in fact, requires that the high residual energy content of waste be exploited to produce heat and/or electric energy. Furthermore, if the waste produced does not pass the strict characteristics imposed by the subsequent Implementation Decree of Aug. 3, 2005 (Definition of the admissibility criteria of waste material in a landfill, published in the Official Gazette nr. 201 of Aug. 30, 2005, art. 8, table 6 of the Implementation Decree of Aug. 3, 2005), this waste must be treated, before being disposed of, "using the best possible techniques available", possibly obtaining energy self-efficiency of the treatment.

The overall quantity of these waste products with a prevalently organic matrix, possibly containing many inert materials, is at present around several thousands of tons/y. There is therefore the necessity of developing a technology capable of thermally and energetically exploiting the waste products of plants, for example, those of refineries, such as oily and biological sludge, with limited quantities of final residues, that have in any case become inert.

Various technologies have been developed for the treatment of organic waste having a high carbon content (waste containing organic substances and with a LHV>13 MJ/kg) or dangerous as it has a high DOC (dissolved organic carbon in the eluate) value in the leaching tests, necessary for defining their destination.

Mechanical treatment is among the most widely-used techniques, such as grinding and homogenization, chemical treatment, stabilization by the addition of suitable reagents (calcium oxide and other particular types of materials having a high adsorbing power) and the biological treatment.

Stabilization with additives, however, and all of the above treatment in general, requires a complex operative sequence which, at the end of the treatment, often generates quantities of waste that has become inert, higher than the initial quantity.

These are therefore extremely expensive technologies (they cost at least 500 keuro/t), and contrary to the policy of final waste minimization (Zero waste).

A technology which, on the other hand, definitely reduces the quantity of waste at the inlet, is co-combustion. In this case, the disposal of waste is effected in a pre-existing waste incineration plant (civil incinerators, for example) which must be authorized for the treatment of that specific type of dangerous waste, according to the provisions of the Legislative Decree of May 11, 2005, nr. 133 ("Implementation of the directive 2007/76/EC, relating to waste incineration" published in the Official Gazette nr. 163 of Jul. 15, 2005—Ordinary supplement nr. 122).

Incineration plants for co-combustion must have a treatment capacity which is such as to make the investment and management costs of the plant advantageous. In particular, an incineration plant that has a significant economic return from the treatment (co-incineration) of dangerous material, must have a treatment capacity in the order of hundreds of thousands of t/y, i.e. such that the "dangerous waste" introduced is a small percentage with respect to the normal matrix at the plant inlet, therefore a quantity which is such as to not disturb the normal functioning of the incinerator.

There are currently 50 incineration plants in Italy, of which 45 are operative and allow energy recovery, and only 8 can also treat special waste materials. At present and according to official sources, there are no co-incineration plants of special dangerous waste-products similar to refinery sludge: according to official data, less than 500 t/y of dangerous waste-products can be treated in the co-incinerator of Messina.

This is because, even if it is theoretically possible, the co-incineration of refinery sludge in Italy (in the amounts produced) is a technology which has not yet been developed on an industrial scale, also in case of incinerators with a high technological development, such as, for example, high-pressure incinerators (up to 10 bar) with "flameless oxyfuel" burners inside the reactor (in which temperatures even higher than 2,000° C. can be reached).

The innovation of incinerators with "flameless oxyfuel" burners consists in creating a flameless combustion regime inside the reactor, obtained by diluting the combustive agent (oxygen) through mixing with combustion fumes which are re-circulated outside the reactor.

This technology has technical difficulties linked to both the treatment of the waste before the process, as this waste is a heterogeneous material (variability of the humidity degree of the elemental chemical composition, of the Higher Calorific Value (PCS,) the physical properties such as viscosity, and also the process itself.

These difficulties entail even higher investment, management and maintenance costs, if compared with the costs of the incinerators.

Further critical aspects of incinerators are due to the choice of the combustion process and to the very nature of the waste-products. The calorific power per mass unit of waste as such, is often relatively limited, due to the presence of non-combustible substances (water and inorganic species, even partially oxidized). The high humidity makes it necessary to effect a preliminary drying operation, before the actual combustion process. The complex and slow kinetics are helped by large air excess, with respect to that which is stoichiometrically necessary: this creates a high turbulence in the primary combustion chamber, which can cause the entrainment of both the light ash and a part of the fine fraction of uncombusted fuel.

The uncombusted product requires a secondary post-combustion chamber in order to respect the regulations on flue-gas emissions. In a combustion plant, the treatment system of fumes, of which dust abatement is a part, is often the most onerous part from an economic point of view, with respect to both investment and also management and maintenance.

The slow combustion kinetics are compensated by an enrichment of air with oxygen, until the latter is used as the sole combustive agent. Apart from the costs linked to the use of this element (due to the necessity of an air fractionation unit), the use of oxygen can produce local temperature peaks, which makes difficult to control the management of the process.

Moments in which the temperature is out of control must be absolutely avoided so as not to produce localized melting, corrosion phenomena and the formation of low melting eutectic compounds on the part of the salts and oxides contained in the ash. In addition, high temperatures favour the formation of thermal NOx which must be eliminated to comply with the regulations in force for combustion emissions.

The process temperature control is normally effected through a decrease in the waste flow-rate at the inlet and/or with the entry of a diluting and cooling stream of air. In this latter case, problems of entrainment may arise. It should also be considered that the cooling and diluting operation of the fumes involves a less efficient recovery of their thermal content.

The possible presence or formation, during combustion, of corrosive substances, favoured by the oxidizing atmosphere ($SO_x$, $NO_x$), can damage the metal parts of the energy recovery sections of the plant. The fume treatment section for abating the acidity also represents an important section of the whole plant. The strong acidity often present in the fumes makes it impossible to completely use the thermal enthalpy of the same, as the acid condensations in the exchangers downstream of the burner must be limited (the temperature inside a heat-exchange system of a burner can never reach outlet temperatures lower than 100° C.)

The frequently small dimension of the plants, rarely over 10 MWe, does not allow high electric and/or thermal energy recovery yields in the conventional cycles used (steam turbine Rankine cycle). In the case of vapour production with a maximum heat efficiency equal to 65-70%, an electric energy yield, net of self-consumption, lower than 20%, is obtained.

There is currently another process which is attempting to treat some types of materials with an organic matrix, such as, for example, tannery sludge: gasification to give synthesis gas (syngas), a technology which has not yet been developed on an industrial scale.

Gasification of organic waste is a process which allows a gaseous fuel to be obtained, starting from an organic waste-product. The reaction gas introduced can be oxygen or air, more or less enriched, water or carbon dioxide. If the combustive agent is oxygen, the gasification envisages the presence of sub-stoichiometric oxygen in the reaction atmosphere, unlike what is required for a traditional complete oxidation.

Sub-stoichiometric oxygen allows a partial oxidation of the material fed. The gasification usually proceeds with successive endothermic and exothermic steps as described hereunder:
  an endothermic step for drying the humidity often present in waste with an organic matrix;
  an endothermic step for pyrolysis, i.e. heating until the partial or total breakage of the molecules with the production of gas and tar;
  gasification of the char with oxygen, water and $CO_2$ (exothermic and endothermic steps) and reactions in gas phase of the volatile products and tars.

The syngas obtained from the gasification mainly contains CO, $H_2$ and light hydrocarbons.

In order to sustain the endothermic steps of the gasification, either direct heating, through the combustion of a part of the material in the same gasifier, or indirect heating, if the heat is provided by heating agents, physically separated from the mass to be gasified, can be exploited.

The two heating forms, however, are not alternative; direct heating, in particular, has a higher heat transfer efficiency, but the LHV (PCI in Italian) of the syngas produced is reduced due to the presence of combustion products.

In order to improve the LHV (PCI in Italian) of the syngas, pure oxygen must be used. This, however, requires the use of plant solutions which are suitable for tolerating the high temperatures that can be reached locally. The variety of technological solutions adopted for gasification reactors is due to these conflicting demands. The most widely-used are the following:
  fixed-bed reactor with descending equicurrent air streams or ascending countercurrent air streams,
  fluid-bed reactors,
  suspended-bed reactor,
  rotating-drum reactor.

The first two types of reactor have been developed within coal gasification, whereas suspended-bed reactors are more suitable for the gasification of liquid biomasses and the treatment of gas containing carbonaceous particulate.

As far as the gasification of waste-products is concerned, above all for small- or medium-sized plants (typically smaller than 10 MWt and up to 1 MWt), recirculating fluid beds have so far had a certain diffusion. However, even if this technology allows an efficient and rapid heat transfer, a good mixing of the reagents and a direct heating, it has significant disadvantages such as:
  a high quantity of particulate in the effluents due to the inevitable comminution effects of the fluidized bed, which, during the process modify their characteristics reducing the starting particle-size;
  the necessity of having an accurate and continuous control of the process, in order to sustain the fluid bed which, especially for waste products, rapidly changes their morphology and density characteristics;
  the necessity of having a specific particle-size of the starting material;
  the necessity of using additives (bed and chemical reagents) which, due to the mechanic abrasion during the process, need to be continuously reintegrated in order to guarantee the fluidization conditions of the bed.

A technology which is potentially much less limiting than the fluid bed, is the rotating drum technology. A rotating-drum gasifier and/or pyrolizer, in fact, allows a large range of waste products to be treated in terms of type, particle-size distribution, humidity; it requires a relatively simple regulation of the process; it does not require auxiliary materials (melting or filling agents); finally, it is suitable for small sizes and for waste with a high LHV (PCI in Italian).

Rotating-drum gasifiers, however, still have considerable disadvantages associated with the heterogeneity of the material at the inlet, such as:

difficulty in determining the dimensional parameters of the reactor (diameter, length, inclination) functional for the completion of the process;

gas with a high tar content;

ash with a high residual carbon content;

poor syngas, normally used for thermally self-sustaining the system;

low overall thermal efficiency;

necessity of auxiliary systems (for example, burners and ventilators) in order to compensate out-of-control cooling and/or heating of the system.

A last technology used for the disposal of waste products with an organic matrix, in particular refinery sludge, is represented by waste-to-energy plants (WTE), in particular batch pyrolysis which has a treatment capacity in the order of the thousands of t/y.

This technology reduces the calorific power of the sludge and allows the process products to be exploited, however, it only partially reduces the volumes involved and produces final ash classified as "dangerous waste" due to the carbon value which is off-limits.

As the higher calorific value found in various samples of these waste products is high, however, the exploitation of the waste-to-energy process is certainly a necessary condition before landfilling.

Patent application WO 2011/007231 describes a process and equipment for the thermal treatment of refinery sludge, such as oily sludge, sludge from wastewater treatment and biological sludge. In particular, WO 2011/007231 describes a continuous process for the thermal treatment of refinery sludge which comprises:

drying the refinery sludge at a temperature ranging from 110 to 120° C.;

gasification of the dried sludge at a temperature ranging from 750 to 950° C. for an overall period ranging from 30 to 60 minutes, in the presence of a gas containing oxygen and water vapour, fed with a differentiated incremental mode, forming syngas and solid residue;

combustion of the syngas at a temperature ranging from 850 to 1200° C. and recycling of the combustion products for the drying and gasification phases;

inertization of the solid residue at a temperature ranging from 1,330 to 1,500° C., through vitrification with flame torches.

One of the disadvantages linked to the process and equipment described in WO 2011/007231 is that the synthesis gas produced is only sucked at the outlet of the gasification chamber. In this way, the syngas flows in equicurrent with the streams of solids (char) and gases produced, jeopardizing the reaction (gas/solid) between the combustive agent fed to the gasifier and the solid produced, and favouring, on the other hand, the reaction (gas/gas) between the syngas and combustive agent. This phenomenon is even more marked as the drying and pyrolysis chamber is aligned with and directly connected to the gasification chamber. The syngas produced in the pyrolysis must therefore enter the gasification chamber, hindering the gas/solid reaction between the combustive agent and solid produced (char).

We would like to summarize the main critical points present in the known technologies described in this text.

Cold inertization techniques imply a complex operative sequence which, at the end of the treatment, generates larger amounts of waste (made inert) than the initial quantity. They are also extremely expensive and contrary to the final waste minimization policy.

Incinerators imply high investment costs and heavy treatment capacities, well above the target of sludge and refinery waste or coming from the petrochemical plant. The technology cannot be managed directly inside the plant, and consequently does not allow an overall and definite vision of the entire treatment chain up to the final disposal of the ash.

Innovative co-incinerators imply higher investment costs with respect to incinerators (the plant is pressurized and has a complex design), technical difficulties linked to the pre-treatment, the process (injection inside the reactor) and maintenance (wear of the refractory materials of the incinerator) which have not yet been solved.

Gasifiers have a complex fluid-dynamics between the combustive agent and fuel. A rotating-drum reactor, in fact, normally functions in equi- or in counter-current and, in both configurations, there is not an adequate mixing degree between the combustive agent and fuel. This type of configuration of the streams, moreover, does not avoid the oxidation of part of the syngas. As the reaction is in homogeneous phase (gas/gas), in fact—normally favoured with respect to reactions in heterogeneous phase (statistically less probable)—the combustive oxygen can easily react prevalently with gaseous elements such as CO and low-molecular-weight hydrocarbons, rather than with the carbon present in the organic waste. In current rotating-drum gasifiers, it is practically impossible for the two conditions of syngas which is rich and with a low carbon content in the ash, to coexist.

Pyrolyzers cause a partial reduction in the volumes involved but a production of final ash classified as "dangerous waste" due to the carbon value outside the limits and to the presence of metals. This is mainly a batch technology, i.e. such as not to guarantee the complete "isolation" of all the process phases, for example, emission problems may arise at the moment of loading and final discharging of the ash.

An objective of the present invention is to propose reaction equipment for the treatment of waste, which is capable of thermally and energetically exploiting waste products coming from refineries or petrochemical plants of an organic and inorganic origin, characterized by a LHV (PCI in Italian) higher than 13,000 kJ/kg, of an organic and inorganic origin, preferably refinery sludge, producing limited quantities of final residues, that have in any case become inert, which depend on the content of inert products in the starting material, which typically rages from 5 to 25% w/w.

A further objective of the present invention is to propose a process for the treatment and thermal and energy exploitation of waste products coming from refineries or petrochemical plants of an organic and inorganic origin, characterized by LHV (PCI in Italian) higher than 13,000 kJ/kg, in particular refinery sludge, producing syngas with a high calorific value which can be used for the self-sustenance of the process and, if produced in excess, used for other purposes within the refinery, or stored. For this purpose, the syngas produced must have a calorific value higher than 1,500 kcak/Nm$^3$ (higher than 6,500 J/Nm$^3$).

Another objective of the present invention is to propose a plant for the treatment and thermal and energy exploitation of waste products coming from refineries or petrochemical plants, organic and inorganic, in particular refinery sludge, said plant preferably comprising the reaction equipment as described and claimed in the present text.

The choice of the correct reaction technology to be adopted for the treatment and thermal and energy exploitation of waste products coming from refineries or petrochemical plants starts from identifying the specific characteristics of these waste products. In particular, refinery sludge, and also petrochemical sludge, have the following basic characteristics:

production potential 6,000-18,000 t/y;
extremely variable humidity degree;
low value of the initial LHV (PCI in Italian);
high value of the LHV (PCI in Italian) after drying;
high percentage of volatile material;
low drying rate but rapid gasification and combustion kinetics;
low value of residual char;
very fine residual ash (below 50 μm).

The objective of the reaction technology selected must be to allow thermal self-sustenance, at the same time obtaining a syngas with a calorific value higher than 1,500 kcal/Nm$^3$ (over 6,500 J/Nm$^3$) with a content of uncombusted products and dust lower than 0.5 g/Nm$^3$. Traditional rotating-drum gasifiers with indirect heating have a poor heat-exchange efficiency and make the two results incompatible.

In order to overcome the limits of traditional gasifiers, the Applicant proposes reaction equipment capable of thermally and energetically exploiting waste products coming from refineries characterized by a LHV (PCI in Italian) higher than 13,000 kJ/kg, of an organic and inorganic origin, in particular refinery sludge, forming a gaseous end-product which comprises syngas separated from a solid final product containing limited quantities of solid residues made inert, which depend on the content of inert products in the starting material, which typically ranges from 5 to 25% w/w.

An object of the present invention therefore relates to reaction equipment comprising:

a drying and pyrolysis device (4) which rotates around its longitudinal, tilted rotation axis (A),
a gasification device (6) which rotates around its longitudinal, horizontal rotation axis (B),
a combustion device (14) comprising a burner (13) having a longitudinal horizontal axis (C),
at least one settling chamber (15) for the collection of intermediate solid residues and the accumulation of intermediate gaseous reaction products,
at least one outlet duct of the gaseous end-products (16), at least one outlet duct of the solid end-products (7), and at least one inlet duct of the feedstock (2)
said equipment being characterized in that:
said combustion device (14), drying and pyrolysis device (4), gasification device (6) are physically separated and positioned on three different levels,
the longitudinal rotation axis (A) of the drying and pyrolysis device (4) is tilted with respect to both the longitudinal rotation axis (B) of the gasification device (6) and also with respect to the longitudinal axis (C) of the combustion device (14),
the longitudinal rotation axis (B) of the gasification device (6) is parallel to the longitudinal axis (C) of the combustion device (14),
the combustion device (14) is in fluid communication with the drying and pyrolysis device (4)
the drying and pyrolysis device (4) comprises, in its interior, a first indirect heat-exchange device (3) in which the combustion fumes coming from the combustion device (14) flow,
at least one settling chamber (15) in fluid communication with said drying and pyrolysis device (4) and with said gasification device (6) and with said combustion device (14), conveying means (5) are positioned in the settling chamber (15) and put the drying and pyrolysis device (4) in fluid communication with the gasification device,
it comprises a second heat-exchange device (12) in fluid communication with the first indirect heat-exchange device (3) and the combustion device (14),
it comprises means for the suction of the intermediate gaseous reaction products, said means being positioned in the settling chamber (15).

The present invention advantageously contributes to reducing the volume of final solid residue (ash) for a percentage of at least 70% (30% with respect to the starting volume): the volumes of final residue after treatment is equal to the volumes of the inorganic component present in the feedstock at the inlet (5-25% w/w).

The reaction equipment described and claimed in the present text allows a syngas to be obtained, having a high calorific value and, in relation to the HCV (higher calorific value) (PCS in Italian) of the waste at the inlet, in excess with respect to self-sustenance, allowing it to be used for other purposes inside the plant and/or stored.

A further object of the present invention relates to a plant for the treatment of organic and/or inorganic waste coming from refineries or petrochemical plants, which comprises the reaction equipment described and claimed in the present text.

The plant has a simple design, it is compact, and operates at atmospheric pressure or under slight depression, and therefore requires a low investment. The plant can be easily managed, needs a low maintenance and is constructed with commercial materials, even if innovative. The indirect heat-exchange device, for example, is constructed with a steel alloy with a high Ni and Cr content. The plant is therefore also suitable for limited flow-rates, ranging from 50 kg/h up to 4,000 kg/h, and can consequently be positioned inside any waste-production plant (refinery or petrochemical plant).

The plant can be run in continuous and can be situated downstream of the waste production area (centrifuge), avoiding its storage, transportation and pre-treatment. This specific feature allows only the residual component of the gasification process to be defined as waste.

The plant operates in a substantially self-sustenance mode, except in the start-up phase, and is therefore particularly economical as it allows the energy part contained in the waste to be almost completely recovered and exploited.

Further objectives and advantages of the present invention will appear more evident from the following description and enclosed figures, provided for purely illustrative and non-limiting purposes.

FIG. 1 shows the reaction equipment according to the present invention, wherein (1) is a mixing device of the heated feedstock, (2) is a means for feeding the feedstock, (3) is an indirect heat-exchange device into which the combustion fumes flow, (4) is a drying and pyrolysis device which rotates around its tilted longitudinal rotation axis (A), (the tilting is not visible in the figure), (5) are conveying means of the intermediate solid residues from the drying and pyrolysis device to the gasification device, (6) is a gasification device which rotates around its own longitudinal rotational axis (B), (7) is an outlet duct of the final solid products, (8) is a burner for preheating the device (6), (9) are injection means of the combustive agents (a mixture of air, oxygen and water), (10) and (11) are regulation or interception devices (preferably slide valves) of the gaseous intermediate production product comprising syngas, (12) is a second heat-exchange device between the combustion fumes and air, (13) is a burner for combustion devices, (14)

is a combustion device with a longitudinal axis (C), (15) is a settling chamber for the collection of the intermediate solid residues and for accumulating the gaseous intermediate reaction products, (16) is a section of the tube in which the suction takes place with the subsequent conveying of the syngas towards post-combustion or to the outside.

Figure 2:
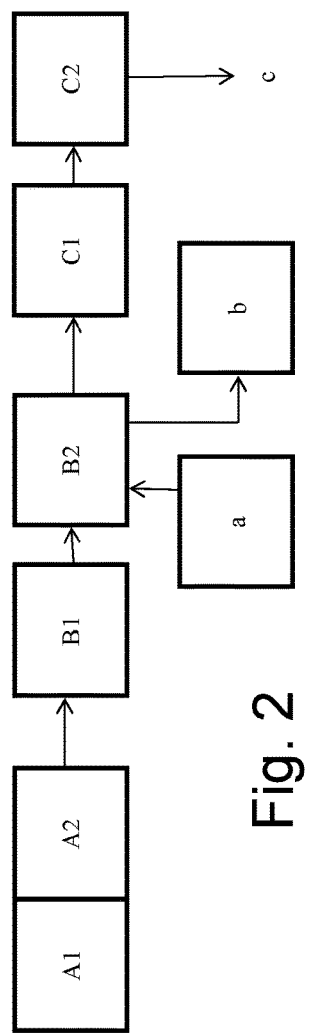

FIG. 2 is a plant for the treatment of waste according to the present invention, wherein (X) is a pre-treatment section which comprises a homogenization system (X1) and feeding system (X2), (Y) is reaction equipment wherein (Y1) is a drying and pyrolysis device, (Y2) is a gasification device into which air (Y3) enters and from which ash (Y4) exits, (Z) is a treatment section of effluents, wherein (Z1) is a post-combustor and (Z2) is a fume treatment system, (Z3) is the wastewater stream which is sent to a water treatment section, not indicated in the figure.

DETAILED DESCRIPTION

With reference to FIG. 1, the reaction equipment object of the present invention comprises:
- a drying and pyrolysis device (4) which rotates around its longitudinal, tilted rotation axis (A),
- a gasification device (6) which rotates around its longitudinal, horizontal rotation axis (B),
- a combustion device (14) comprising a burner (13) having a longitudinal horizontal axis (C),
- at least one settling chamber (15) for the collection of intermediate solid residues and the accumulation of intermediate gaseous reaction products,
- at least one outlet duct of the gaseous end-products (16), at least one outlet duct of the solid end-products (7), and at least one inlet duct of the feedstock (2)
said equipment being characterized in that:
- said combustion device (14), drying and pyrolysis device (4), gasification device (6) are physically separated and positioned on three different levels,
- the longitudinal rotation axis (A) of the drying and pyrolysis device (4) is tilted with respect to both the longitudinal rotation axis (B) of the gasification device (6) and also with respect to the longitudinal axis (C) of the combustion device (14),
- the longitudinal rotation axis (B) of the gasification device (6) is parallel to the longitudinal axis (C) of the combustion device (14),
- the combustion device (14) is in fluid communication with the drying and pyrolysis device (4)
- the drying and pyrolysis device (4) comprises, in its interior, a first indirect heat-exchange device (3) in which the combustion fumes coming from the combustion device (14) flow,
- at least one settling chamber (15) in fluid communication with said drying and pyrolysis device (4) and with said gasification device (6) and with said combustion device (14),
- conveying means (5) are positioned in the settling chamber (15) and put the drying and pyrolysis device (4) in fluid communication with the gasification device,
- it comprises a second heat exchange device (12) in fluid communication with the first indirect heat exchange device (3) and the combustion device (14),
- it comprises means for the suction of the intermediate gaseous reaction products, said means being positioned in the settling chamber (15).

The rotation rate of the drying and pyrolysis devices and of the gasification device depends on the viscosity characteristics of the waste to be treated. The rotation rate preferably ranges from 1 to 3 rpm.

The inclination of the longitudinal horizontal rotation axis (A) of the drying and pyrolysis device (4) with respect to the longitudinal axis (B) of the gasification device (6) or with respect to the longitudinal horizontal axis (C) of the combustion device, can vary according to the physico-chemical properties of the waste to be treated. The maximum inclination of said axis is preferably 2%, i.e. a variation in height of 2 cm at the most, for each meter of length.

The equipment, object of the present invention, advantageously enhances the efficiency of the heat and mass exchanges, it favours the production of syngas with a high calorific value, it reduces the dragging of fine powders in the gas, and does not require auxiliary fuels except in the starting phase.

A heated device can be present upstream of the reaction equipment, for mixing the feedstock, together with means for feeding the same, preferably a pump or a screw pump.

The gasification device (6) can comprise a burner (8) for effecting the pre-heating, and injection means (9) of the combustive agents, which can be air, oxygen or water. Regulation devices can be present, such as slide valves, which intercept and regulate the introduction (11) of the gaseous intermediate reaction products containing syngas into the combustion device (15) or the outflow of these products (10) towards a possible post-combustion device.

The inclination of the longitudinal rotation axis (A) facilitates the conveying of the intermediate solid residues from the drying and pyrolysis (4) device to the gasification device (6). Said sedimentation area is situated under the suction point of the gaseous intermediate reaction product containing syngas, said suction point being located in the settling chamber (15) in which the gaseous intermediate reaction product and the intermediate solid residues that accumulate, converge. The suction means of the syngas are positioned in said suction point.

The conveying means can be a screw pump or a conveyor belt.

The gasification device and the drying and pyrolysis device are physically separated and positioned on three different levels so as to favour an increase in the efficiency of the reaction, as in this way, the reaction can also thermally exploit the residual carbon of the char and guarantee a total ash production, fly ash in addition to the bottom ash with a low carbon content.

Inside the drying and pyrolysis device (4), there is a first indirect heat-exchange device (3) in fluid communication with the combustion device (14) and a second heat-exchange device (12). Said first heat-exchange device is preferably a duct with a circular section, which comprises in its interior a second duct having a circular section, coaxial to the first, with an initial conical conveyer, said ducts forming an annular area.

The combustion fumes leaving the combustion device (14) enter the annular area and exchange heat. The exhausted fumes, which have released heat, enter the second heat-exchange device (12) (fume-air heat exchanger) where they release heat again both to the air, which will be the combustive agent in the combustion device (14), and also to the air flowing into the gasification device.

The duct transfers heat by radiation towards the inner walls of the drying device (4) and also to the waste to be treated.

Optionally, the reaction equipment described and claimed in the present text comprises means for feeding a traditional fuel, preferably methane, lpg or gasoil, in order to trigger combustion in the combustion device (14) in the starting phase.

The second heat-exchange device (12) is in fluid communication with both the first indirect heat-exchange device (4) and also with the combustion device (14). Said device (14) comprises an inlet for the air and one for the exhausted fumes leaving the first indirect heat-exchange device (3). The heat of the exhausted fumes is recovered in said second heat exchange device, so as to reduce the fuel supply to the combustion device.

A further object of the present invention relates to a process for the treatment of organic and/or inorganic waste of refineries or petrochemical plant comprising the following steps:
a) drying and pyrolysis by the indirect heating of said waste, forming a first gaseous intermediate product comprising wet syngas and a first intermediate solid residue containing char, volatile ash and tar;
b) separation of the first intermediate gaseous product produced in (a) from the first intermediate solid residue and sending said solid residue to gasification;
c) gasification of the intermediate solid residue obtained in (a) in the presence of a combustive agent consisting of a mixture of air, oxygen and water, said combustive agent flowing in countercurrent with respect to the solid residue, and thus forming a second intermediate gaseous product containing syngas and a final solid residue containing ash;
d) separation of the second gaseous intermediate product produced in (c) from the final solid residue;
e) mixing the gaseous intermediate product produced in (a) with the gaseous intermediate product produced in (c) and suction, of at least a part, of the mixture formed to be sent either to a refinery gas supply network, after possible treatment, or to combustion for self-sustaining the process for the treatment of waste products.

Said process is preferably effected in the reaction equipment described and claimed in the present text.

A further object of the present invention relates to a plant for the treatment of organic and/or inorganic waste of refineries or petrochemical plants, which comprises:
a pre-treatment section comprising a homogenization system and feeding means of said waste products,
a reaction section comprising the reaction equipment described and claimed in the present text, discharging means of the ash produced and means for feeding a stream containing oxygen,
a treatment section of the effluents, which comprises a post-combustion device and a treatment system of the waste products.

The process for the treatment of waste, object of the present invention, also comprises a combustion phase between a fuel selected from syngas, methane, lpg, or gasoil and an oxidizing agent containing oxygen, for example air.

Said combustion generates the combustion fumes which can be used for drying and pyrolyzing waste products by means of indirect heating.

The process for the treatment of waste products, object of the present invention, also comprises a recovery phase of the heat of the exhausted combustion fumes produced by means of indirect heating.

The drying and pyrolysis are preferably carried out at a temperature ranging from 550° C. to 700° C. (the drying, in particular, is effected at a temperature ranging from 100° C. to 120° C.)

The gasification is preferably carried out at temperatures ranging from 600° C. to 900° C. Both the drying and the pyrolysis and gasification are effected under a pressure of 15-30 Pa.

The feedstock preferably comprises refinery sludge having the following weight composition:
humidity from 30% to 80%
volatile material from 10% to 60%
fixed carbon from 5 to 40
hydrogen (H) from 2 to 10%
sulfur (S) from 0 to 10
nitrogen (N) from 0% to 5%
and the following properties:
LHV (PCI in Italian) from 2,800 to 4,500 kcal/kg (12,000-19,000 kj/kg)
kinematic viscosity from 2,000 to 10,000 P (Poise or cSt).

The final gaseous products contain syngas and the solid products contain ash. The intermediate solid residues produced during the drying and pyrolysis, contain fly ash, tar and char. The solid element produced during the drying and pyrolysis is fed to the gasifier (6) in counter-current with respect to the gaseous intermediate product, containing syngas, formed during gasification. The combustive agent used in gasification can be selected from a mixture of water, oxygen or air, and is fed to the gasification device (6) in a distributed mode and with a progressive differentiated flowrate. Said flowrate is preferably higher towards the discharge area of the final solid residue, ash, produced in gasification, and is almost null near the suction points of the mixture of gaseous intermediate products formed in (a) and (c), which contain syngas, so as to prevent the combustion of the syngas formed in gasification and minimize the residual carbon content in the ash (final solid).

Alternatively, the combustive agent is fed in a single solution by injection means suitably configured. Said injection means, preferably a lance, must be capable of nebulizing the combustive agent.

The mixture formed with the gaseous intermediate products containing syngas and produced during gasification or in the drying and pyrolysis phase, is preferably sent for combustion. Said mixture can be completely or partially burned, in order to thermally self-sustain the process for the treatment of waste or, if in excess, it can be destined for other uses for unitary operations outside the process, for example it can be burned in a post-combustor using suitable regulation means, preferably total or partial conveyance valves (10). Alternatively, said mixture containing syngas can be stored, and in this case the combustion device is substituted by a combustion chamber having smaller dimensions and there is no need for effecting fume treatment.

The drying and pyrolysis can be effected with either the syngas of the mixture produced in (e) or with the combustion fumes, or with traditional fuels introduced directly in the proximity of the first heat-exchange device inside the drying and pyrolysis device.

The process for the treatment of waste described and claimed, preferably uses the reaction equipment object of the present invention.

The process described and claimed has various technical advantages which are indicated hereunder.

The separation of the process areas, drying-pyrolysis and gasification, has been considerably amplified by introducing a collection chamber of the solids (15), suction means of the syngas at the outlet of the drying and pyrolysis device (4), and positioning the gasification (6), drying and pyrolysis (4) and combustion (14) devices on different levels.

For the purposes of the process, the suction before gasification of at least a part of the gaseous intermediate product containing syngas, produced in the drying and pyrolysis, avoids the reaction of the syngas with the combustive agents fed to the gasification and allows a reduced volume to be obtained together with a high LHV (PCI in Italian) of the syngas produced globally, as a sum of the syngas produced in pyrolysis and gasification.

By subtracting the syngas produced in the drying and pyrolysis, the combustion reaction between the combustive agents at the inlet of the gasification device and the solid fuels produced in the pyrolysis (fly ash, tar and char) becomes possible and is favoured.

The distribution, with a progressively differentiated flow-rate of the combustive agents in gasification, is effected so as to prevent the combustion of the gaseous intermediate product containing syngas formed in gasification and minimize the residual carbon content in the ash.

The overall syngas obtained in the drying and pyrolysis device and in the gasification device, is a chemically rich syngas which can be extracted, if in excess, with respect to what is necessary for the self-sustenance of the process.

EXAMPLE

This example is carried out using the reaction equipment for the treatment of organic and/or inorganic waste of refineries or petrochemical plants illustrated in the enclosed FIG. 1. The material treated with said equipment has the following average characteristics:

| Element | % w/w |
| --- | --- |
| C | 33.4 |
| H | 4.71 |
| S | 3.33 |
| O | 2.87 |
| N | 0.52 |
| Ash | 24.6 |
| Humidity | 30.6 |
| Kinematic viscosity | 5,000 P (Poise or cSt) |
| Inlet material flow-rate | 50 kg/h |

The operative functioning conditions of said equipment are the following:
Rotation rate of the drier/pyrolizer: 1.5 rpm
Rotation rate of the gasifier: 1.7 rpm
Temperature of the combustion chamber: 900° C.
Average $O_2$ concentration: 11%
Fume temperature at the inlet of the radiating tube: 800° C.
Average temperature in the pyrolysis area: 600° C.
Average temperature in the gasification area: 750° C.
Syngas flow-rate Q1: 53 kg/h
Syngas LHV (PCI in Italian): 2,500 kcal/Nm$^3$
Powders in the syngas: 0.2 g/Nm$^3$
Air flow-rate Q2: 15 Nm$^3$/h
Fume flow-rate Q3: 500 Nm$^3$/h
$O_2$ in fumes: 11.8%
Ash flow-rate Q4: 13 kg/h
Maximum ash concentration: 2.7%
The experiment allowed the following verifications to be effected:

1. the effective volume reduction percentage of the material to be disposed of,
2. the adequacy of the syngas to be burned and self-sustain the process,
3. the low content of carry over in the syngas,
4. the possibility of obtaining syngas in excess with respect to the self-sustenance of the system.
5. the potentiality of the treatment.

The invention claimed is:

1. A reaction equipment, comprising:
    a drying and pyrolysis device which rotates around its longitudinal, tilted rotation axis (A),
    a gasification device which rotates around its longitudinal, horizontal rotation axis (B),
    a combustion device comprising a burner having a longitudinal horizontal axis (C),
    at least one settling chamber for the collection of intermediate solid residues and the accumulation of intermediate gaseous reaction products,
    at least one outlet duct of the gaseous end-products, at least one outlet duct of the solid end-products, and at least one inlet duct of a feedstock,
    wherein:
    the combustion device, drying and pyrolysis device, and gasification device are physically separated and positioned on three different levels,
    the longitudinal rotation axis (A) of the drying and pyrolysis device is tilted with respect to both the longitudinal rotation axis (B) of the gasification device and also with respect to the longitudinal axis (C) of the combustion device,
    the longitudinal rotation axis (B) of the gasification device is parallel to the longitudinal axis (C) of the combustion device,
    the combustion device is in fluid communication with the drying and pyrolysis device,
    the drying and pyrolysis device comprises, in its interior, a first indirect thermal exchange device in which the combustion fumes coming from the combustion device flow,
    at least one settling chamber is in fluid communication with the drying and pyrolysis device, the gasification device and the combustion device,
    conveying means are positioned in the settling chamber and put the drying and pyrolysis device in fluid communication with the gasification device,
    the equipment comprises a second thermal exchange device in fluid communication with the first indirect thermal exchange device and the combustion device, and
    the equipment comprises means for the suction of the intermediate gaseous reaction products, the means being positioned in the settling chamber.

2. The reaction equipment according to claim 1, wherein the rotation rate of the drying and pyrolysis device and gasification device ranges from 1 to 3 rev./min.

3. The reaction equipment according to claim 1, wherein the inclination of the longitudinal axis (A) of the drying and pyrolysis device with respect to the longitudinal axis (B) of the gasification device, or (C) combustion device, has a variation in height of 2 cm at the most, for each meter of length.

4. The equipment according to claim 1, wherein regulation devices are present in the settling chamber.

5. The equipment according to claim 1, wherein the first thermal exchange device is a duct having a circular section which comprises in its interior a second duct having a circular section, coaxial to the first, with an initial conical conveyer, the ducts forming an annular area.

6. A process for the treatment of organic and/or inorganic waste of refineries or petrochemical plants the process comprising following:
a) drying and pyrolysis by indirect heating of the waste, forming a first intermediate gaseous product comprising wet syngas and a first intermediate solid residue containing char, volatile ashes and tar;
b) separating the first intermediate gaseous produced in (a) from the first intermediate solid residue and sending the solid residue to gasification;
c) performing gasification of the intermediate solid residue obtained in (a) in the presence of a comburent consisting of a mixture of air, oxygen and water, the comburent flowing in countercurrent with respect to the solid residue, and thus forming a second intermediate gaseous product comprising syngas and a final solid residue comprising ashes;
d) separating the second intermediate gaseous product produced in (c) from the final solid residue; and
e) mixing the intermediate gaseous product produced in (a) with the intermediate gaseous product produced in (c) and performing suction of at least a part of the mixture formed to be sent either to a refinery gas supply network, after possible treatment, or to combustion for self-sustaining the process for the treatment of waste products; wherein occurs in a reaction equipment, comprising:
a drying and pyrolysis device which rotates around its longitudinal, tilted rotation axis(A),
a gasification device which rotates around its longitudinal, horizontal rotation axis (B),
a combustion device comprising a burner having a longitudinal horizontal axis (C),
at least one settling chamber for the collection of intermediate solid residues and the accumulation of intermediate gaseous reaction products,
at least one outlet duct of the gaseous end-products, at least one outlet duct of the solid end-products, and at least one inlet duct of a feedstock,
wherein: the combustion device, drying and pyrolysis device, and gasification device are physically separated and positioned on three different levels,
the longitudinal rotation axis (A) of the drying and pyrolysis device is tilted with respect to both the longitudinal rotation axis (B) of the gasification device and also with respect to the longitudinal axis (C) of the combustion device,
the longitudinal rotation axis (B) of the gasification device is parallel to the longitudinal axis (C) of the combustion device,
the combustion device is in fluid communication with the drying and pyrolysis device,
the drying and pyrolysis device comprises, in its interior, a first indirect thermal exchange device in which the combustion fumes coming from the combustion device flow,
at least one settling chamber is in fluid communication with the drying and pyrolysis device, the gasification device and the combustion device,
conveying means are positioned in the settling chamber and put the drying and pyrolysis device in fluid communication with the gasification device,
the equipment comprises a second thermal exchange device in fluid communication with the first indirect thermal exchange device and the combustion device, and
the equipment comprises means for the suction of the intermediate gaseous reaction products, the means being positioned in the settling chamber.

7. The conversion process according to claim 6, wherein the drying and the pyrolysis are carried out at temperatures ranging from 550 to 700° C.

8. The conversion process according to claim 6, wherein the gasification is carried out at temperatures ranging from 600 to 900° C.

9. The process according to claim 6, wherein both the drying and pyrolysis, and also the gasification are carried out at a pressure of 15-30 Pa.

10. The process according to claim 6, wherein the waste comprises refinery sludge having the following weight composition:
humidity from 30% to 80%;
volatile material from 10% to 60%;
fixed carbon from 5 to 40;
hydrogen (H) from 2 to 10%;
sulphur (S) from 0 to 10;
nitrogen (N) from 0% to 5%;
and the following properties:
LHV (PCI in italian) from 2800 to 4500 kcal/kg; and
kinematic viscosity from 2000 to 10000 P (Poise or cSt).

11. The process according to claim 6, which also comprises a combustion phase between a fuel selected from the group consisting of syngas, methane, LPG, and gasoil and a comburent comprising oxygen.

12. The process according to claim 6, which comprises a recovery phase of the heat of the exhausted combustion fumes produced during the indirect heating phase of the drying and pyrolysis.

13. The process according to claim 6, wherein in the gasification, the comburent is introduced with a progressively differentiated flowrate, greater at the inlet and almost zero at the outlet.

14. A plant, comprising:
a pre-treatment section comprising a homogenization system,
a reaction section comprising the reaction equipment according to claim 1, and
a treatment section of effluents which comprises a post-combustion device and a treatment system of the waste products.

* * * * *